United States Patent
Grenon et al.

(10) Patent No.: US 9,897,081 B2
(45) Date of Patent: Feb. 20, 2018

(54) HEATING POSITIVE-DISPLACEMENT LIQUID PUMP

(71) Applicant: Gotec SA, Sion (CH)

(72) Inventors: Vincent Grenon, Riddes (CH); Denis Albrecht, Champlan (CH)

(73) Assignee: GOTEC SA, Sion (CH)

( * ) Notice: Subject to any disclaimer, the term of this patent is extended or adjusted under 35 U.S.C. 154(b) by 1036 days.

(21) Appl. No.: 13/827,393

(22) Filed: Mar. 14, 2013

(65) Prior Publication Data

US 2014/0096686 A1    Apr. 10, 2014

(30) Foreign Application Priority Data

Oct. 5, 2012 (CH) ................................ 1872/12

(51) Int. Cl.
| | |
|---|---|
| A47J 31/20 | (2006.01) |
| F04B 15/04 | (2006.01) |
| A47J 31/36 | (2006.01) |
| A47J 31/46 | (2006.01) |
| F04B 53/08 | (2006.01) |
| F04B 53/16 | (2006.01) |

(52) U.S. Cl.
CPC ............ *F04B 15/04* (2013.01); *A47J 31/36* (2013.01); *A47J 31/46* (2013.01); *F04B 53/08* (2013.01); *F04B 53/162* (2013.01)

(58) Field of Classification Search
CPC . A47J 31/36; A47J 31/46; F04B 15/04; F04B 53/08; F04B 53/162
USPC ..... 99/201, 280, 297, 302 R, 301, 304, 305; 219/243, 535, 521, 544, 546, 548, 549, 219/306, 308, 302
See application file for complete search history.

(56) References Cited

U.S. PATENT DOCUMENTS

| | | | |
|---|---|---|---|
| 2,654,505 A | 9/1947 | Fuhrman | |
| 3,508,845 A | 4/1970 | Strassburger | |
| 4,871,089 A * | 10/1989 | Rader | A47J 31/402 222/146.5 |
| 5,296,081 A * | 3/1994 | Morin | B65C 9/34 156/498 |
| 2006/0222351 A1* | 10/2006 | Cezayirli | F24H 1/102 392/490 |
| 2008/0295698 A1* | 12/2008 | Carr | A47J 31/36 99/302 R |

(Continued)

FOREIGN PATENT DOCUMENTS

| | | |
|---|---|---|
| EP | 0496939 A1 | 9/1991 |
| EP | 1097663 A1 | 2/1999 |
| EP | 1380243 A1 | 12/2002 |

(Continued)

OTHER PUBLICATIONS

International Search Report for CH 18722012 dated Apr. 2, 2013.

*Primary Examiner* — Phuong Nguyen
(74) *Attorney, Agent, or Firm* — Pearne & Gordon LLP

(57) ABSTRACT

Liquid pump (1) comprising:
a cylinder (24),
an inlet valve (47a) for feeding the liquid into said cylinder (24),
a discharge valve (47b) for discharging the liquid out of said cylinder (24),
a piston (52) actuated by a transmission tube (51) and sliding in said cylinder (24) so as to draw said liquid into said cylinder (24) and then to expel it from said cylinder (24).
The cylinder (24) comprises at least one heating cartridge (41) in order to heat the liquid in said cylinder (24).

21 Claims, 2 Drawing Sheets

(56) References Cited

U.S. PATENT DOCUMENTS

2010/0272582 A1* 10/2010 Grenon .................. A47J 31/46
　　　　　　　　　　　　　　　　　　　　417/53

FOREIGN PATENT DOCUMENTS

| FR | 2012636 A1 | 3/1970 |
| FR | 2780262 A1 | 12/1999 |
| WO | 2005108849 A2 | 11/2005 |
| WO | 2009087203 A1 | 7/2009 |
| WO | 2010/113116 A1 | 10/2010 |
| WO | 2012069594 A1 | 5/2012 |

* cited by examiner

HEATING POSITIVE-DISPLACEMENT LIQUID PUMP

The present application claims priority of Swiss patent application CH2012/1872, filed on Oct. 5, 2012, the contents of which is hereby enclosed by reference.

TECHNICAL FIELD

The present invention concerns a liquid pump comprising at least one heating cartridge. This pump enables liquid to be pumped, heated and also the volume to be measured.

STATE OF THE ART

Many examples are known of liquid pumps operating according to different principles. There are also different types of water heating devices. Many coffee machines use a tank in which the water is preheated before being pumped through the coffee powder and then poured into the cups. These devices require preheating a volume of water greater than what will be finally used, which causes a waste of energy. When conversely a volume of coffee greater than the tank's capacity is required, it is necessary to wait after the water has been filled until the newly filled water has been heated.

One also knows continuous liquid heating devices in which the water is heated when it passes through a tube or pipe. Such devices are described for example in patent application EP-A1-1380243 (Nestec SA) which illustrates a liquid heating module comprising a hollow tube provided with at least two heating resistors, for example conductor wires or inks deposited onto a substrate. A similar solution is also described in EP-A1-1097663.

The prior art solutions generally require a pump to circulate the water in a heating tube or a thermo-block, and a flowmeter for controlling the quantity of water supplied. The complete device thus includes many distinct discrete parts that are complex to combine and whose assembly requires a considerable volume. Furthermore, the water temperature depends both on the electric current in the heating module and on the water flow in the tube, which requires a rather complex control system.

Patent application FR2780262 describes a coffee machine having a hollow piston pump actuated by an electromagnetic motor. The hollow piston through which the liquid passes is difficult to clean; furthermore, it does not allow a constant water volume to be displaced at each actuating. A flowmeter is thus required, formed in this case of an idle wheel with fins that is put in rotation by the flow of liquid.

Other examples of hot drinks dispensers including a piston pump are described in U.S. Pat. No. 2,654,505 and FR2012636.

WO2005108849 describes a pump for lubricants comprising at least one metering piston driven by an actuator that comprises a heating element. The heating element heats a material that expands in order to drive the displacement of the metering piston. This pump does not provide for heating the liquid in the cylinder.

U.S. Pat. No. 3,508,845 describes a method and a device for obtaining high pressures with a diaphragm compressor. The oil pumped by a piston is previously heated by a heating resistor in a tank. This device entails considerable losses since the heat produced by the heating resistor is transmitted to the liquid upstream of the pumps.

Patent application EP-A1-496939 (Ricerca Elettromecanica) describes another pump for a coffee machine comprising a piston sliding in a cylinder actuated by a motor and an actuator. The piston's run, which determines the volume of liquid drawn into and then expelled from the cylinder, is controlled by means of micro-connectors or of an encoder connected to the motor. The signals from the micro-switches or from the encoder are processed by an electronics that generates control signals for the motor. The volume of water in the cylinder is heated by means of a resistive wire coiled around the outer surface of the cylinder and through which runs an electric current.

This arrangement enables the liquid to be heated directly inside the pump, so that an additional heating tube is not required. Furthermore, using a piston pump makes it possible to easily control the volume of drawn liquid, simply by modifying the piston's run. However, the manufacture of such a pump with external coil is costly. It can furthermore happen that the wire of this coil breaks.

Patent document WO2009/087203 (Gotec SA) describes a liquid pump comprising an electric circuit for heating the cylinder having at least two branches in order to electrically heat the liquid in the cylinder, wherein the branches are made in the form of an electrically conducting thin track deposited on or in the wall of the cylinder and occupying different longitudinal portions along said cylinder so as to control the longitudinal portion of the heated cylinder by selecting the branches through which a current runs according to the volume of heated liquid that is to be produced.

Thanks to this pump, it is possible to select the longitudinal portion of the cylinder that is heated at each instant by selecting the branches that are supplied with current. The number of branches that will be supplied with current depends on the quantity of volume to be heated, so as to avoid dissipating heat over large portions of the cylinder beyond the upper limit of the piston's run. In one embodiment, only the lower half of the cylinder is heated with one branch when half a volume of the cylinder of hot water is to be produced.

However, this pump has different disadvantages. First, the industrial production of electrically conducting tracks onto a cylinder proves delicate and costly.

Furthermore, in the case of the cylinder being installed in a horizontal position, i.e. when the piston slides along a horizontal direction, and of the cylinder containing little liquid, the steam that forms above the liquid in the cylinder can destroy or loosen the resistive branches. Such a horizontal installation is however useful for some configurations of coffee machines, for example in the case of use being made in a car, in a trailer, in a truck or any other electrically autonomous vehicle.

The horizontal position of the pump is also advantageous for reducing the liquid's temperature gradient, which improves the quality of the coffee produced and reduces the waste of energy.

Such a horizontal use of the pump described in WO2009/087203, however, is not suggested since its correct operation is guaranteed only in the case where its piston slides along a vertical direction.

WO2012069594 describes a positive-displacement liquid pump with a piston sliding in a cylinder in such a way as to draw a liquid into said cylinder and then expel it from said cylinder. At least one heating cartridge is lodged at least partly in a transmission tube lodged in the piston rod and plunged into the liquid in order to heat up the liquid when a current flows in this cartridge.

Such heating cartridges are known as such and commercially available at a reduced cost. It is thus possible to make a very economical piston heating pump by using such a cartridge as heating element.

One disadvantage of this solution is that it requires at least one joint, for example an X-ring joint between the heating cartridge and the piston or piston rod. These joints tend to wear, notably due to the displacements of the piston around the cartridge, to the high water temperature and to limescale deposits. These pumps therefore require periodical maintenance in order to replace this joint.

There is thus a need for a liquid pump that makes it possible to eliminate or in any case reduce these problems of the prior art.

There is thus a need for a liquid pump that makes it possible to supply a controlled volume of water with a constant temperature along the entire through-flow as the pump of WO2009/087203, that can also be used when the piston slides in a horizontal direction, that can be manufactured in an economical manner and that requires only a minimum of maintenance.

BRIEF SUMMARY OF THE INVENTION

One aim of the present invention is to avoid or alleviate one or several of the above-mentioned disadvantages.

According to the invention, these aims are achieved notably by means of a liquid pump according to claim 1.

The inventive pump comprises a cylinder, a piston sliding in said cylinder so as to draw a liquid into said cylinder and then to expel it from said cylinder, and at least one heating cartridge lodged at least partly in or against the walls of said cylinder in order to heat the liquid in said cylinder.

This solution thus allows an economical heating of the walls of the cylinder by means of heating cartridges that are economical and easy to insert into a cylinder. It furthermore makes it possible to avoid the necessity of joints around an immersed cylinder.

The invention is based notably on the observation that heating cartridges supplying sufficient heat to heat a volume of hot drinks are available at reduced diameters, for example cartridges with a diameter of less than 8 millimeters, which makes it possible to integrate them easily into the walls of a cylinder without requiring substantial added thickness.

In one embodiment, the pump comprises three heating cartridges distributed around the periphery of the cylinder. It is thus possible to produce heat in a homogeneous manner around the volume of drawn liquid.

The heating cartridge or cartridges can for example be lodged in one respectively several longitudinal openings in the cylinder walls. The diameter of these openings is advantageously the same as the outer diameter of the cartridges (disregarding the play necessary for inserting the cartridges). It is thus possible to transmit, with minimum losses, the heat generated by the cartridge or cartridges to the cylinder body and then to the liquid contained inside the cylinder.

The pump can furthermore comprise one or several fuses to protect the electric circuit powering the heating cartridges. This fuse or these fuses can be lodged in or against the walls of the cylinder, for example in grooves provided at the periphery of the cylinder. Thus, the replacement of these fuses and their connection to the heating cartridges is easy from outside the cylinder, without having to disassemble the piston. It is possible to connect a fuse to each heating cartridge. It is also possible and advantageous to connect a fuse to the phase and another fuse to the neutral conductor of each heating cartridge. Each fuse can be lodged in a distinct groove. The unit comprised of the cylinder-piston-heating element-fuses thus constitutes a block that can easily be removed or replaced and the fuses placed in the open grooves do not overheat.

The piston can be driven in a translation movement thanks to a screw engaged in a nut connected to the piston rod; the rotation of the screw thus generates the longitudinal displacement of the piston.

This pump can advantageously be used in a machine for producing hot drinks, for example a coffee machine.

BRIEF DESCRIPTION OF THE FIGURES

Examples of embodiments of the invention are given in the description illustrated by the attached figures in which.

EXAMPLE(S) OF EMBODIMENTS OF THE INVENTION

In one embodiment, the present pump can be used in replacement for the one described in patent application WO2012069594, the contents of which are hereby incorporated by reference. The elements not modified as compared to this prior art are not described; for example, the piston driving mechanism can comprise an electric motor, a belt and a screw of the type described in this prior application, or can be based on another mechanism within the reach of the one skilled in the art.

Figure 1:
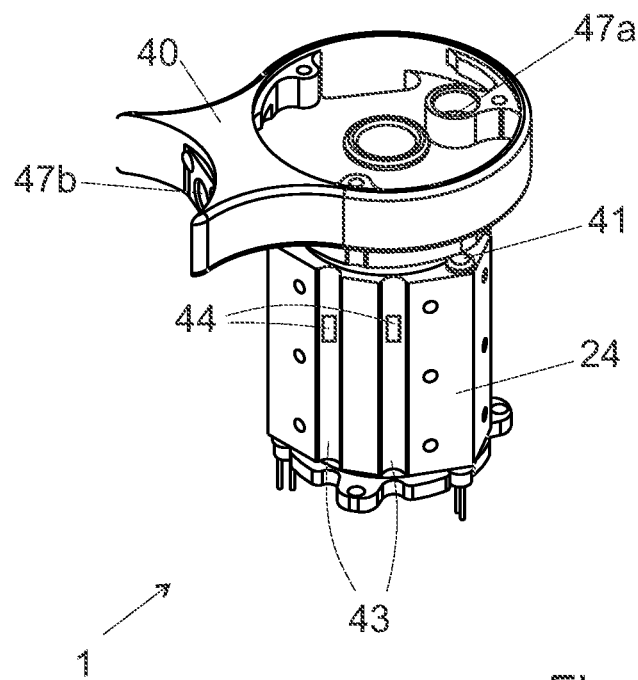
FIG. 1 illustrates a perspective view of an embodiment of the pump according to the invention.
Figure 2:
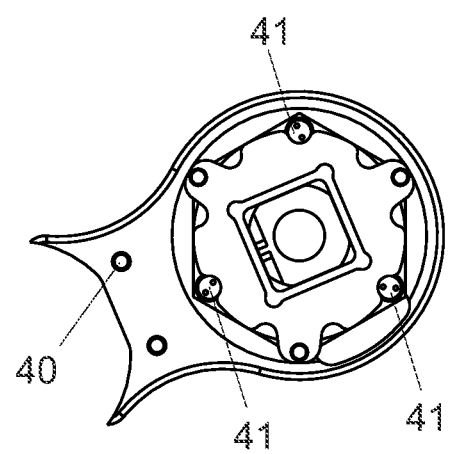
FIG. 2 illustrates a view from above of the pump of FIG. 1.
Figure 3:
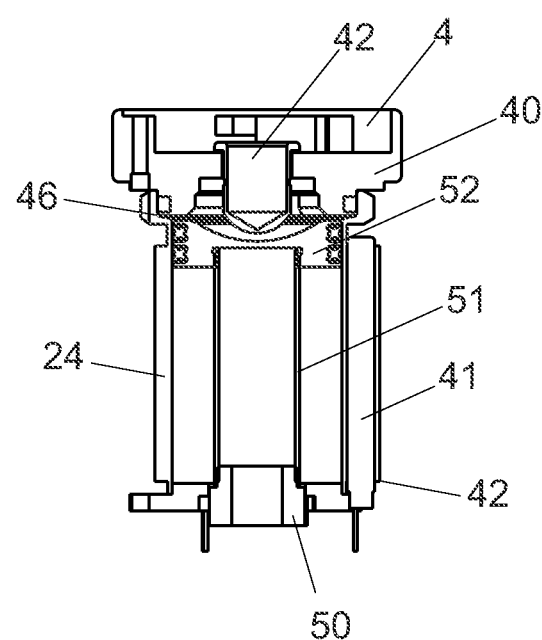
FIG. 3 illustrates a cross-sectional view of the pump of FIG. 1.

FIGS. 1 to 3 illustrate an overall view of an embodiment of the heating piston pump according to the invention. The illustrated pump comprises a cylinder 24 in which a piston 52 slides with its piston rod 51. Joints 46 prevent water infiltrations between the piston head 52 and the inner surface of the cylinder. The cylinder head is closed by a cylinder cover 4 provided with inlet valves 47a and discharge valves 47b in order to let a cold liquid into the cylinder when the piston descends and expel the same liquid, heated, when the piston rises again. The lower extremity of the piston rod 51 is provided with a nut 50 that enables the piston 52 to be moved by having a driving screw (not represented) turning in this nut.

The cylinder 24 is constituted by a block advantageously made by extrusion, for example a block of aluminum or of another metal that is easy to extrude and a good heat conductor. The inner wall of the cylinder can be provided with a coating, for example a Teflon coating, in order to improve its tribological properties. The walls of the cylinder 24 are provided with longitudinal openings 42, numbering 3 in this example, in order to lodge/house therein the heating cartridges 41 in parallel to the displacement direction of the piston. A different number of cartridges, for example two, 4, 5 or 6 cartridges, can be provided.

The heating cartridges have a cylindrical outer surface with a diameter corresponding to that of the openings 42, so as to allow them to be inserted whilst maximizing the transfer of the heat produced by the cartridges to the cylinder. The cartridges can for example have an outer diameter of less than 8 millimeters, for example a diameter of 6.5 millimeters.

The thickness of the cylinder wall is preferably greater wherever the heating cartridges 41 are inserted and less between these heating cartridges. This enables the mass of the cylinder and thus its thermal inertia to be reduced in order to heat it with a minimum of heat input whilst ensuring that the cartridges are entirely lodged in the cylinder wall in order to reduce thermal energy losses.

Each cartridge can comprise one or several heating zones, corresponding to one or several electric circuits. In another variant embodiment, each cartridge can comprise a progressive heating zone, corresponding to a resistor wound in a non-regular fashion. In this manner, it is possible not only to achieve the same "ad hoc" heating effects of the liquid according to its volume, by thus reducing the waste of energy, but also to use the pump when the piston slides along a horizontal direction, which allows a more homogeneous distribution of the temperature in the liquid to be heated, which makes it possible in this way to better adapt to such a pump being used in a car or a trailer for example.

In a variant embodiment, the pump according to the invention comprises several resistors in parallel in the same heating cartridge, or even several heating cartridges, to heat a greater quantity of liquid more quickly. In this manner, it is thus possible to switch on a coffee machine including such a pump and obtain near instantaneous heating. For example, it is possible to mount three heating cartridges spaced angularly at 120° or four heating cartridges spaced by 90°, in a single volume of water or in several independent volumes of water, or passed through successively by the same portion of liquid.

In another variant, each heating cartridge comprises a temperature sensor for measuring the temperature of the liquid: unlike known solutions, this measure is efficient and accurate since it is performed at the center of the volume of heated liquid.

In another variant embodiment, the pump comprises a position sensor, for example an angular sensor arranged to cooperate with the teeth of a driving pulley that by means of an electric motor rotates a thrust screw for displacing the piston in order to measure the position of the piston and thus how much liquid has been drawn and/or expelled. A light barrier and/or a switch can advantageously be provided on the transmission tube to determine the point zero of the piston's run.

Fuses 44 are advantageously provided to limit the electric current in the heating cartridges 41. In one advantageous embodiment, a fuse 44 is connected serially in the phase of each heating cartridge 41 and another fuse 44 is connected serially with the neuter conductor of each heating cartridge 41. The fuses are advantageously mounted against the outer surface of the cylinder 24, for example in housings 43 formed as longitudinal grooves in the outside flanks of the cylinder 24. This enables the fuses to be connected to the cylinder, which can thus be mounted and disassembled with the cylinders whilst placing the fuses in an easily accessible and less hot zone of the cylinder.

In a preferred embodiment, the run of the piston 52 can be controlled in order to vary the quantity of liquid drawn and then expelled. The run is preferably controlled by a microcontroller, not represented, by modifying the time during which the motor driving the screw engaged in the nut 50 is powered. The control can be performed in open circuit, i.e. by applying a pulse length that depends only on the setpoint value chosen for the run and the volume, or preferably in closed circuit with a counter reaction loop taking into account a measured value supplied by a position sensor.

Advantageously, the pump comprises an electronic circuit, not represented, for example a microcontroller controlled by a computer program or a FPGA circuit that preferably controls the following events:

opening and closing inlet and discharge valves powering the motor actuating the screw causing the piston 52 to be displaced controlling the different heating zones of each heating cartridge 41 taking into account the signals supplied by a position sensor of the piston, by a temperature sensor and by a control circuit (not represented) for entering setpoint values for the volume to be heated and/or the temperature to be achieved.

It is also possible to use a double-effect piston that draws and forces back the liquid continuously so as to reduce the draw-off time. In this case, the pump will include two cylinder heads & covers, two inlet valves and two discharge valves.

The inventive device and method can be used for example for a hot drinks dispenser, notably a coffee machine, including a coffee machine for a car or trailer or camper van or all electrically autonomous vehicles such as airplanes, taxis, trains, ships etc. A similar pump can also be used for dosing heated liquid, in the food industry, for gluing with heated glue, for evacuating condensates etc.

REFERENCE NUMBERS USED IN THE FIGURES

1 pump
24 cylinder
4 first part or complete cylinder head & cover (unit comprised of valves, joints and cartridge)
40 cylinder head & cover
41 heating cartridge
42 longitudinal opening
43 housing for fuses (grooves)
44 fuses
46 O-ring or X-ring joint
47a, 47b valves
50 nut
51 piston rod
52 piston

The invention claimed is:

1. A liquid pump comprising:
   a cylinder having an outer surface comprised of a plurality of longitudinally extending surface sections wherein adjacent surface sections define a non-zero angle therebetween;
   a piston sliding in said cylinder along a longitudinal direction so as to draw said liquid into said cylinder and then to expel it from said cylinder,
   at least one heating cartridge including a housing, the at least one heating cartridge positioned within the non-zero angle defined between the adjacent surface sections in order to heat the liquid in said cylinder, wherein said heating cartridge extends along a longitudinal axis and is removably inserted with a longitudinal axis of said heating cartridge disposed along said longitudinal direction and parallel to the displacement direction of the piston.

2. The pump according to claim 1, comprising at least three heating cartridges distributed around the periphery of said cylinder.

3. The pump according to claim 1, said cylinder comprising at least one longitudinal opening having the same diameter as said heating cartridge, wherein said heating cartridge is lodged in said longitudinal opening.

4. The pump according to claim 1, comprising at least one fuse lodged at least partly in or against the walls of said cylinder, wherein said fuse is electrically connected serially with said heating cartridge to limit the electric current in said heating cartridge.

5. The pump according to claim 4, said cylinder comprising at least one housing on its outer periphery for housing therein said fuse.

6. The pump according to claim 5, said cylinder comprising at least three housings constituted by longitudinal grooves for lodging/housing therein at least three fuses in order to limit the electric current in the heating cartridges thereby protecting individually at least three heating cartridges.

7. The pump according to claim 1, comprising a piston rod provided with a nut disposed in a bottom of said cylinder, wherein said piston is configured to move in said longitudinal direction within said cylinder.

8. The pump according to claim 1, wherein said cylinder is constituted by a block of extruded aluminum.

9. The pump according to claim 1, wherein the at least one heating cartridge is lodged within a wall of the cylinder to indirectly heat the liquid in the cylinder.

10. The pump according to claim 9, wherein the at least one heating cartridge is positioned parallel to the displacement direction of the piston.

11. The pump according to claim 1, wherein the outer surface of the cylinder is hexagon-shaped.

12. A liquid pump comprising:
a cylinder comprising at least one longitudinal opening defined inside the wall of said cylinder, the cylinder having an outer surface comprised of a plurality of longitudinally extending surface sections wherein adjacent surface sections define a non-zero angle therebetween;
a piston sliding in said cylinder along a longitudinal direction so as to draw said liquid into said cylinder and then to expel it from said cylinder,
at least one heating cartridge including a housing, the at least one heating cartridge positioned within the non-zero angle defined between the adjacent surface sections, wherein said heating cartridge extends along a longitudinal axis in order to heat the liquid in said cylinder, wherein said heating cartridge is removably inserted in said longitudinal opening with its longitudinal axis disposed along said longitudinal direction and parallel to the displacement direction of the piston.

13. The pump according to claim 12, wherein the at least one heating cartridge is lodged within a wall of the cylinder to indirectly heat the liquid in the cylinder.

14. The pump according to claim 12, wherein the outer surface of the cylinder is hexagon-shaped.

15. A liquid pump comprising:
a cylinder comprising at least one longitudinal opening defined inside the wall of said cylinder, the cylinder having an outer surface comprised of a plurality of longitudinally extending surface sections wherein adjacent surface sections define a non-zero angle therebetween;
a piston sliding in said cylinder along a longitudinal direction so as to draw said liquid into said cylinder and then to expel it from said cylinder,
at least one heating cartridge including a housing, the at least one heating cartridge positioned within the non-zero angle defined between the adjacent surface sections, wherein said heating cartridge extends along a longitudinal axis in order to heat the liquid in said cylinder, wherein said heating cartridge is removably inserted in said longitudinal opening with its longitudinal axis disposed along said longitudinal direction and parallel to the displacement direction of the piston,
at least one fuse lodged against the outer surface of the wall of said cylinder, wherein said fuse is electrically connected serially with said heating cartridge to limit the electric current in said heating cartridge.

16. The pump according to claim 15, wherein said cylinder comprises at least one longitudinal groove in the outside flanks of the cylinder wall and wherein sad fuse is lodged in said longitudinal groove.

17. The pump according to claim 15, wherein the at least one heating cartridge is lodged within a wall of the cylinder to indirectly heat the liquid in the cylinder.

18. The pump according to claim 15, wherein the outer surface of the cylinder is hexagon-shaped.

19. A liquid pump comprising:
a cylinder comprising
at least two housings constituted by longitudinal grooves for lodging/housing therein at least two fuses,
an outer surface comprised of a plurality of longitudinally extending surface sections wherein adjacent surface sections define a non-zero angle therebetween,
wherein said cylinder is constituted by a block of extruded metal;
a piston sliding in said cylinder along a longitudinal direction so as to draw said liquid into said cylinder and then to expel it from said cylinder,
at least one heating cartridge including a housing, the at least one heating cartridge positioned within the non-zero angle defined between the adjacent surface sections in order to heat the liquid in said cylinder, wherein said heating cartridge extends along a longitudinal axis and is removably inserted with the longitudinal axis of said heating cartridge disposed along said longitudinal direction and parallel to the displacement direction of the piston,
wherein the at least two fuses limit the electric current in the heating cartridges thereby protecting individually at least two heating cartridges.

20. The pump according to claim 19, wherein the at least one heating cartridge is lodged within a wall of the cylinder to indirectly heat the liquid in the cylinder.

21. The pump according to claim 19, wherein the outer surface of the cylinder is hexagon-shaped.

* * * * *